United States Patent [19]

Bertsch et al.

[11] Patent Number: 5,195,085
[45] Date of Patent: Mar. 16, 1993

[54] COMMUNICATION LINK IDENTIFIER

[75] Inventors: Charles J. Bertsch, Howell; John T. Biggs, Brick Town, both of N.J.

[73] Assignee: AT&T Bell Laboratories, Murray Hill, N.J.

[21] Appl. No.: 580,728

[22] Filed: Sep. 11, 1990

[51] Int. Cl.5 .............................................. H04J 1/16
[52] U.S. Cl. .................... 370/13; 370/58.1; 371/20.1; 379/1
[58] Field of Search ............. 370/14, 13, 110.2, 110.3, 370/110.1, 58.1; 371/20.1; 379/6, 1, 21

[56] References Cited

U.S. PATENT DOCUMENTS

| | | | |
|---|---|---|---|
| 3,943,298 | 3/1976 | Clark | 379/248 |
| 4,022,972 | 5/1977 | Smith | 370/14 |
| 4,195,206 | 3/1980 | Baichtal | 370/14 |
| 4,258,236 | 3/1981 | Conklin | 379/5 |
| 4,320,497 | 3/1982 | Mori et al. | 370/14 |
| 4,424,421 | 1/1984 | Townsend et al. | 370/14 |
| 4,467,148 | 8/1984 | Stafford | 379/5 |
| 4,713,810 | 12/1987 | Chum | 370/14 |
| 4,759,049 | 7/1988 | Mangini | 379/25 |
| 4,937,825 | 6/1990 | Ballard | 371/20.1 |
| 4,964,120 | 10/1990 | Mostashari | 370/14 |

Primary Examiner—Douglas W. Olms
Assistant Examiner—T. Samuel
Attorney, Agent, or Firm—David R. Padnes

[57] ABSTRACT

In a communications system having components which are interconnected via communications links, the system is provided with capability of responding to the application of a predetermined test signal to a link with information which identifies that link. Such information can take a variety of forms including the name of one or more persons assigned to use the link, and/or the telephone number or numbers associated with the link. This capability greatly reduces the time and expense associated with the maintenance and testing of a variety of communications systems, such as PBXs and central office switching machines.

19 Claims, 6 Drawing Sheets

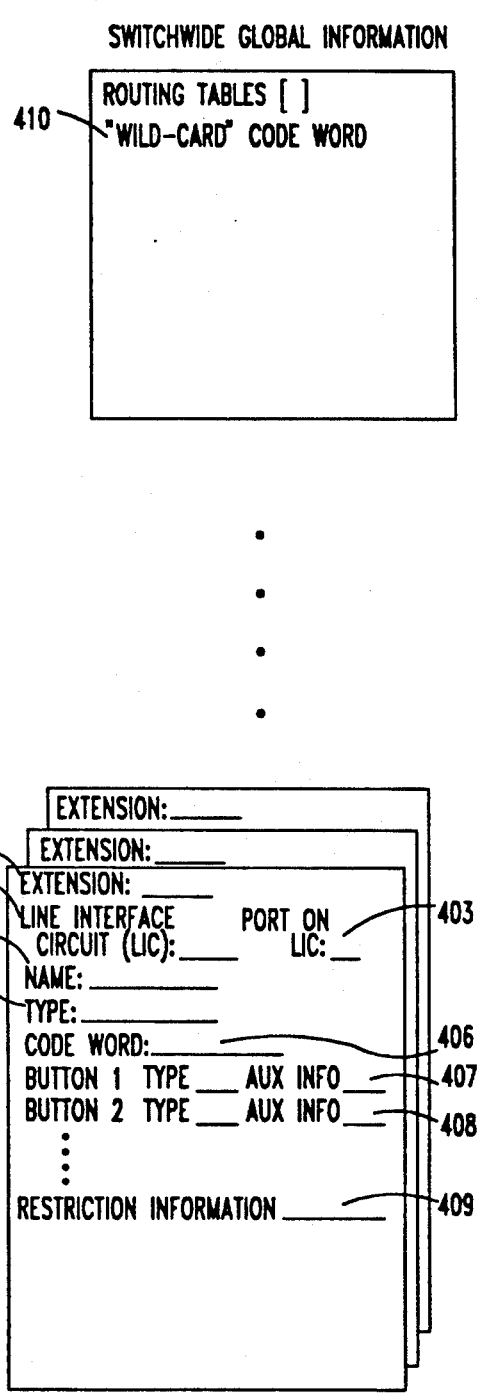
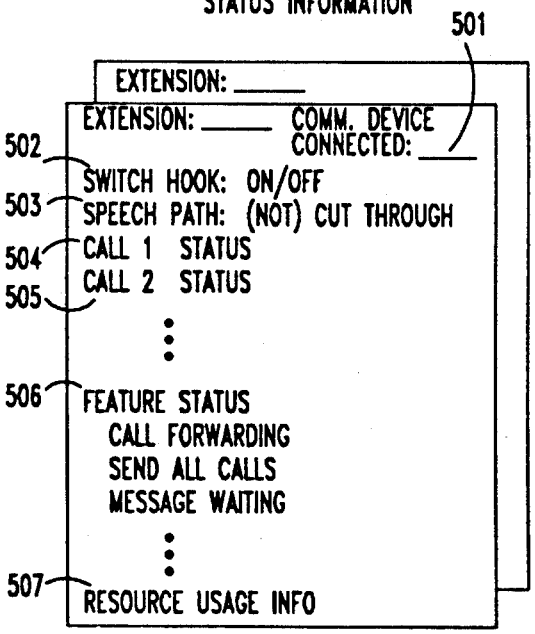
FIG. 4
FIG. 5
STATUS INFORMATION

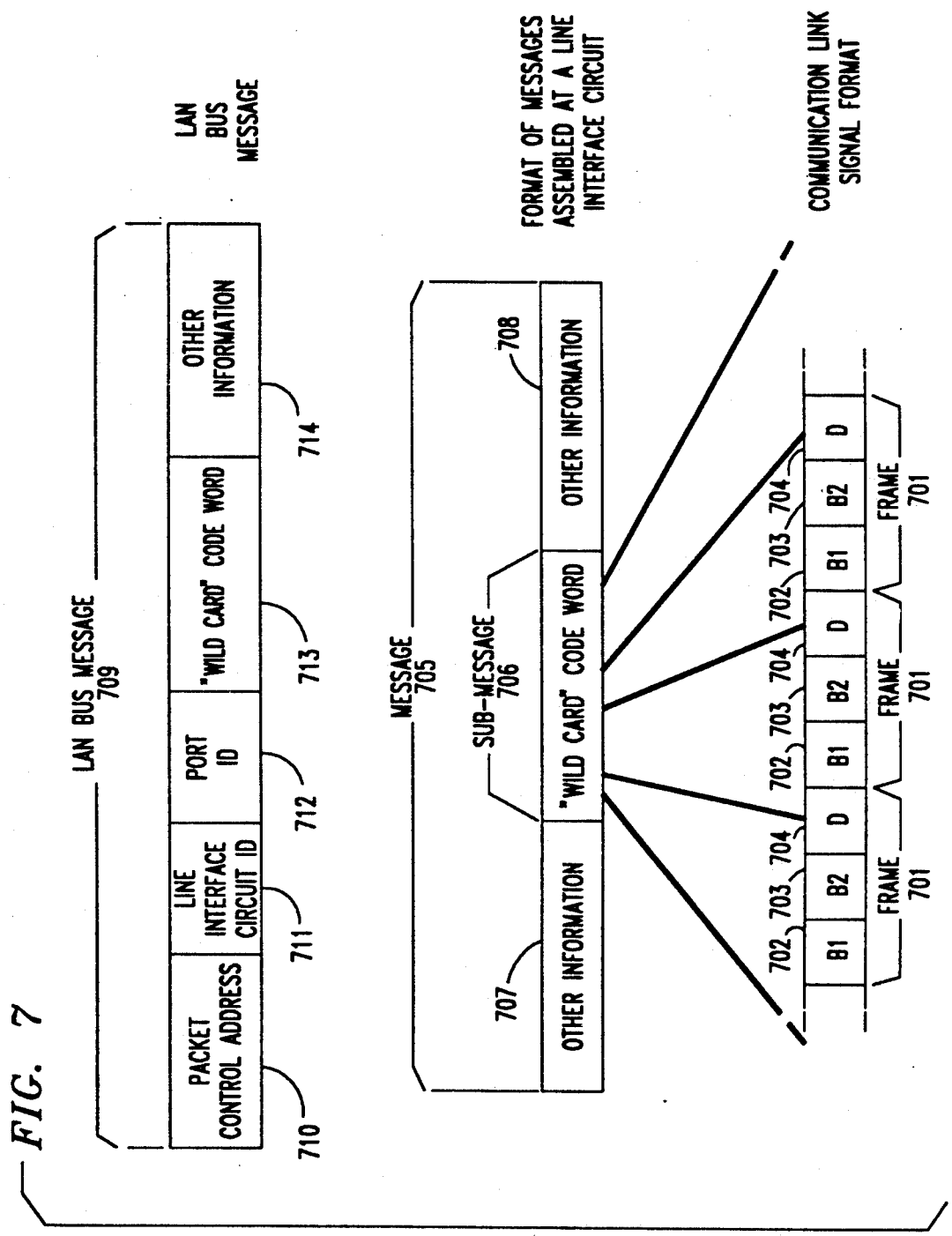

COMMUNICATION LINK IDENTIFIER

TECHNICAL FIELD

The present invention relates to a technique for tracking and diagnosing interconnection problems in communications equipment.

BACKGROUND OF THE INVENTION

Communications systems typically include several components which are interconnected via signal-carrying paths or communications links. Such communications links can be realized using a variety of different technologies including twisted pair, coaxial cable, optical fibers and radio. Many communications systems contains computerized diagnostics which can quickly determine the existence of a fault. However, once it has been determined that the fault is due to a problem in a communications link, correction of the fault typically requires either the tracing of the troublesome link to determine the precise location of the fault or the reassignment and replacement of the same with one or more spare communications links.

While the use of a spare communications link advantageously avoids the need to locate the fault, such spares are not always available. Indeed, the availability of such spares in communications systems which were wired at the time of installation and whose burgeoning growth and accompanying demand for interconnections have severely drained the initial allocation of spare communications links. Moreover, the installation of additional communications links after installation to restore a sufficient allocation of spares is oftentimes difficult, if not impossible, in many system environments.

The task of tracing and correcting interconnection problems in large communications systems, e.g., switching systems and private branch exchanges (PBXs), which include a large number of communications links, is a time-consuming and costly process with a substantial portion of the time and expense being associated with link tracing. One process of link tracing involves the use of two craftspersons. One craftsperson starts at a point in the link where a problem has been detected and proceeds to trace this link and successively apply signals at selected points in order to determine the location of the fault. At each point, the craftsperson tracing the link generally dials another craftsperson located at a system administration console. This step verifies that the troublesome link, and not some other, is being traced and that signal continuity is present. While this technique provides satisfactory results, the time and expense associated with the coordination of the work of two craftsperson oftentimes exceeds system objectives and does not meet customer demands for the rapid restoral of communications services.

Another tracing procedure involves the attachment of a radio transmitter having a predetermined transmitting frequency to the defective communications link so that the latter serves as an antenna. Tracing this link is then accomplished by following the route of the link with a radio receiver. The radio receiver is tuned to the transmitter's transmitting frequency so that the receiver will respond with an audible signal or will display a noticeable deflection of the receiver's signal strength meter when the receiver is close to the communications link. When the receiver ceases to respond, the location of the fault is determined, assuming that the route of the defective link has been properly followed. There are several shortcomings with this procedure. The first is that it is easy to inadvertently deviate from the route of the defective link and thereby cause a cessation of the receiver's response even though the location of the fault has not been located. Second, this technique, in areas where there are many densely-packed interconnections, e.g., an interconnection closet or cross-connect field, cannot locate the traced communications link or the fault therein. Finally, the radiation of the radio signal from the wire pair antenna interferes with the operation of voice and data communications devices utilizing links adjacent to the defective one. This interference, which results in a mildly-annoying tone in a voice circuit, can completely interfere with certain data communications protocols and render data communications unintelligible.

Therefore, it would be extremely desirable if a scheme for tracing communications links which did not have the prior art limitations could be devised.

SUMMARY OF THE INVENTION

The present invention is directed to reducing the time and expense associated with tracing and correcting interconnection problems in communications systems having a plurality of communications devices each served by an associated communications link. Pursuant to the present invention, the communications system has the capability of providing information which identifies the communications link to which a predetermined test signal is applied. It is envisioned that this test signal can be applied one or more times to a communications link that is being traced during system maintenance and testing. As a result, the person tracing any particular link and receiving the link-identifying information is given confirmation that the desired link and not some other is being traced and that signal continuity exists.

In the disclosed embodiment, the test signals can be conveniently provided by available communications terminal devices and the identifying information can include such things as the telephone number associated with the link and/or the name of the customer assigned to use the link. In addition, the identifying information can be coupled to the display portion of such terminals for convenient viewing. The present technique advantageously avoids the prior art's need for interaction between two craftspersons during communications link tracing and can provide an accurate determination of the location of the fault even in areas of densely-packed interconnections. Finally, with the present invention there is no communications disruption caused by radio signal interference.

BRIEF DESCRIPTION OF THE DRAWING

In the drawing:

FIGS. 4 and 5 are representations of the translation data and status data respectively stored in the translation and status memories of FIG. 1;

FIG. 7 is a diagram of the signal formats used in the disclosed embodiment of the present invention.

DETAILED DESCRIPTION

Figure 1:
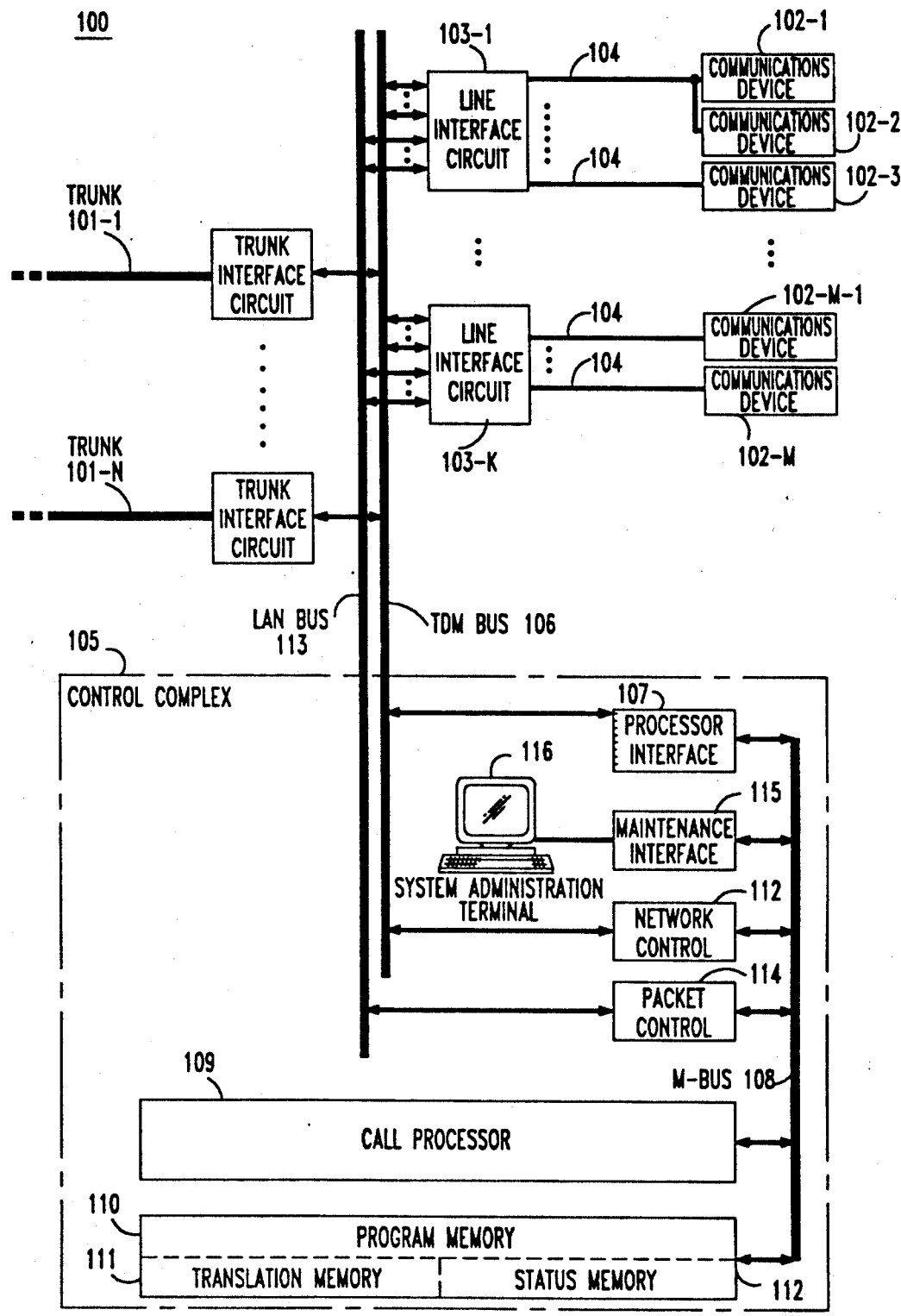
FIG. 1 is a block-schematic diagram of an exemplary communications system to which the present invention pertains.

FIG. 1 shows an exemplary application of the present invention wherein a Private Branch Exchange (PBX) 100—for example, an AT&T Definity ® telecommunications system—is disposed between a plurality of trunks 101-1 through 101-N and a plurality of communications devices 102-1 through 102-M. Generally, the number of communications devices exceeds the number of trunks so that $M > N$. Trunks 101-1 through 101-N connect to an external communications network (not shown). The communications devices encompass a myriad of types and may include station sets, personal computers, video terminals, environmental sensing devices, such as smoke and fire detectors, facsimile machines, etc., and may utilize a number of different protocols. Each of the communications devices is attached to an associated one of the line interface circuits 103-1 through 103-K, where K is generally $\leq M$, via an associated communications link 104. For purposes of clarity at this point in the description, each communications link is shown as a simplified, direct connection. The end of each communications link 104 connected to a line interface circuit terminates at one of a plurality of ports of that line interface circuit. Therefore, a single line interface circuit serves as an interface for a plurality of communications devices. In addition, one communication link can be shared by more than one communications device. In this regard, note that communications devices 102-1 and 102-2 share the same communications link.

PBX 100 provides a communications system switching interface for incoming, outgoing and internal communications. "Incoming" communications are those which originate within the external communications network and are destined for at least one of the communications devices 102-1 through 102-M. "Outgoing" communications are those which originate from one of these communications devices and are destined for some other communications device within the external communications network (both not shown). In FIG. 1, "internal" communications are those which originate from one of the communications devices 102-1 through 102-M and terminate on a different one of these communications devices. Of course, as is well-known, PBX 100 can be one PBX in a network of interconnected PBXs and, in such situations, internal communications can also originate from and terminate on communications devices in different PBXs in the network of PBXs.

For any of the foregoing types of communications, signalling information has to be coupled to the destined communications device. This coupling of signalling information is through the control complex 105 but the voice/data communications which follows this signalling transfer is not coupled to the control complex, but rather is transferred directly between the trunk interface and line interface circuits by the TDM bus. Signalling for incoming communications, received via a trunk and its associated trunk interface circuit, are routed to control complex 105 via time-division-multiplexed (TDM) bus 106. Within the control complex, the signalling is serially coupled through processor interface 107 and M-bus 108 to call processor 109. Processor 109, utilizing software stored in program memory 110 and specific system information stored in translation memory 111 and status memory 112, processes the received dialed digits for the incoming communications to provide signalling to the destined communications device via its associated line interface circuit and communications link. This connection to the associated line interface circuit is provided via M-bus 108, network control 112 and TDM bus 106. Within the associated line interface circuit, the incoming signalling is routed to the port connected to the communications link extending to the destined communications device. Similarly, signalling for outgoing communications is outputted to the associated communications link and line interface circuit and is then routed to control complex via the TDM bus. Within the control complex, the signalling for outgoing communications is serially routed through network control circuit 112, M-bus 108 and call processor 109. Within the call processor, the dialed digits are analyzed utilizing the software within program memory 109 and specific system information stored in the translation and status memories and a signalling interconnection is provided to one of the trunks and its associated trunk interface circuit in accordance with a predetermined routing scheme. This interconnection is provided via M-bus 108, processor interface 107 and TDM bus 106. Internal communications between at least two communications devices in PBX 100 are processed in much the same fashion as just described with the call processor determining the line interface circuit associated with the destined communications device. The signalling connection to and from the call processor is provided via the TDM bus, network control and M-bus. If, however, the destined communications device in an internal communications is in another PBX networked with PBX 100, then the call processor routes the signalling to a preselected trunk and trunk interface circuit via the M-bus, processor interface and TDM bus. Within the other PBX, communications services are provided as if the communications originated within that PBX.

PBX 100 also includes local area network (LAN) bus 113 and packet control circuit 114 which are respectively utilized in lieu of the TDM bus, and network control circuit for signalling between the call processor and line interface circuits for certain types of communications devices. System Administration Terminal (SAT) 116 and maintenance interface 115 are also included in PBX 100 for maintenance and administration purposes and provide a mechanism for inputting information into translation memory 111 and monitoring the contents of status memory 112.

Figure 2:
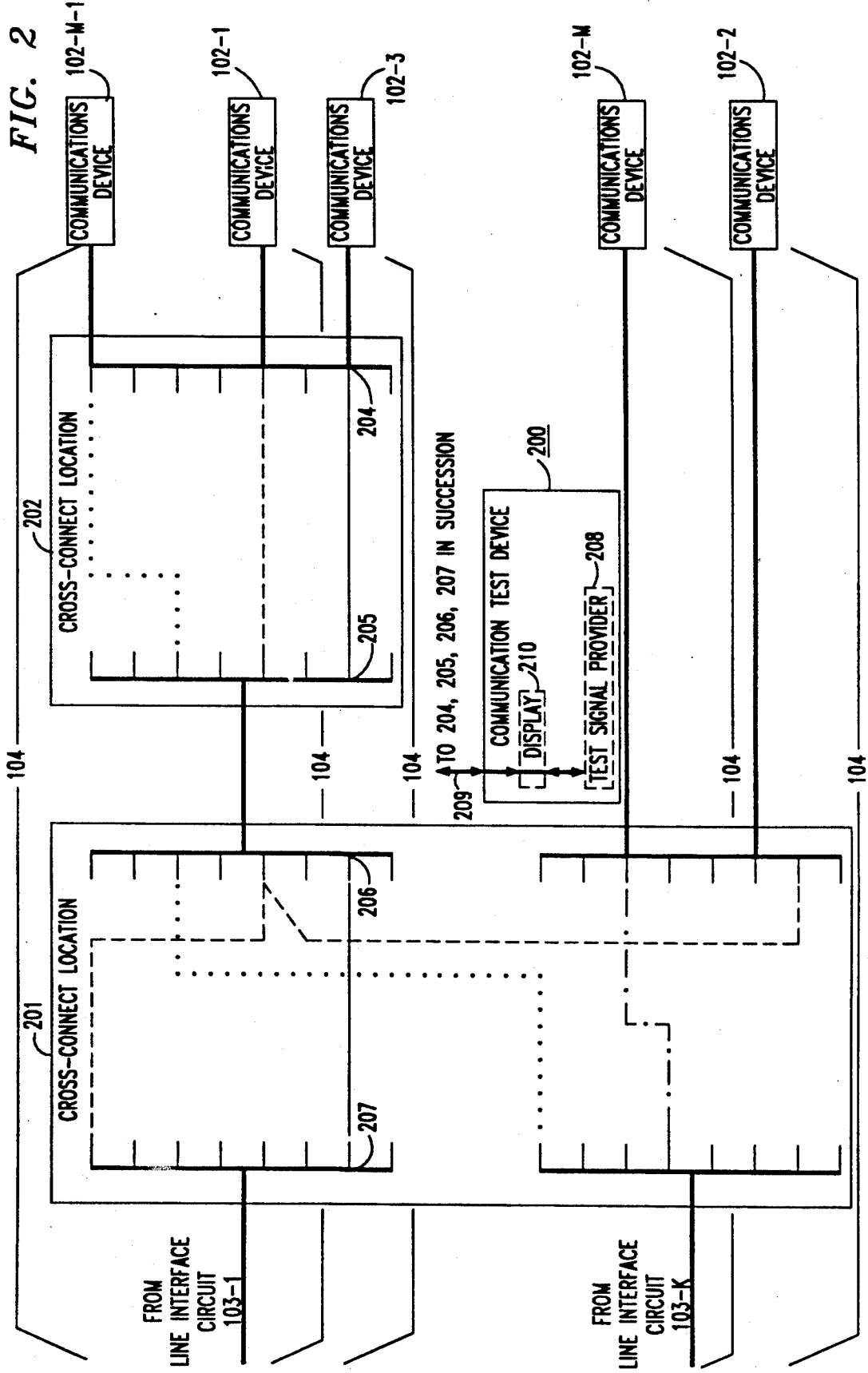
FIG. 2 is a block-schematic diagram depicting in greater detail the communications links between the communications devices and line interface circuits of FIG. 1.

The control complex, line interface circuits and trunk interface circuits of PBX 100 are usually disposed within one physical location, e.g., an equipment closet or utility room. The communications devices, however, are spread over a building or group of buildings and, therefore, any communications links 104 can be long and may extend for up to a mile. For other system applications, the length of the communications link is virtually limitless by the periodic incorporation of information signal amplifiers or repeaters. Moreover, to permit easy reassignment of the line interface circuits associated with a particular communications device as well as to provide an orderly mechanism for routing of the communications links, each link is routed through one or more cross-connect locations. FIG. 2 shows an illustrative routing for the five communications devices depicted in FIG. 1. This routing utilizes cross-connect locations 201 and 202. It should be appreciated that at each cross-connect location, the communications links are densely packed and such packing makes the task of tracing and testing any communications link difficult and subject to error. Indeed, the number of communications links coverging at a cross-connect location can vary from a hundred to several thousand. Accordingly, in situations where there is a problem in a communications link, the task of tracing the communications link is time-consuming and prone to error. Indeed, the prior art technique utilizes two craftsperson—one to trace the link and one at the SAT to confirm both the existence of signal continuity and that the correct link is being traced.

The present invention addresses the problems associated with the tracing of communications links 104 by providing PBX 100 with the ability to respond to the application of a predetermined test signal to a communication link with information which identifies that link. Therefore, the need for a craftsperson at the SAT is eliminated, because the receipt of the communications-link-identifying information by the craftsperson tracing the link indicates the existence of signal continuity and whether or not the desired link is being traced. In general, it is contemplated that the predetermined test signal will be applied to the traced communications link at the cross-connect location(s) for that link. In FIG. 2, for a complete tracing of the communications link extending to communications device 102-3, the test signals are applied using communications test device 200 to interconnection points 204-207, in succession. It should, of course, be understood that while the cross-connection locations are convenient places to apply the test signals, such signals can be applied to any point in the traced link. signals, such signals can be applied to any point in the traced link. Communications test device includes a test signal providing mechanism 208 and signal conductors for coupling this test signal to a communications link. Preferably, device 200 also includes a display 210 for displaying the communications-link-identifying information.

In the disclosed embodiment, this identifying information can take a variety of forms and can include the name of the person or persons assigned to use the communications link being traced and/or the telephone number or numbers and/or line interface circuit and port associated with the communications device or devices assigned to the traced communications link. In lieu of the telephone number or numbers, the PBX extension or extensions of such communications devices can, of course, be provided.

The present invention advantageously makes use of the fact that the communications system utilizes a digital code word for communications device identification. The need for such a code word arises from the interconnection of communications devices to the line interface circuits. Specifically, as discussed, a single communications link can be shared by more than one communications device. Moreover, the particular communications devices sharing a communications link can vary with time. Referring to FIG. 1, communications devices 102-1 and 102-2 are two devices which share a communications link. Such sharing creates problems. First, as the shared communications link terminates on a single line interface circuit port, the PBX requires knowledge of which of these communications devices are communicating information at any time as well as some mechanism of supplying separate communications to each of these devices. In addition, it may be desired that different communications service capabilities be provided to these communications devices even if they are identical. For example, in voice communications services, the communications devices are station sets and certain ones of these sets may have conferencing capability while others do not, or certain station sets may be permitted access to the external communications network while others are not. Or, only some station sets may be provided with a message waiting indicator lamp. To assure that the above-described capabilities can be provided, each communications device in PBX 100 transmits a different, predetermined digital code word. This transmission is advantageously forwarded to the call processor when the communications device is first connected to a communications link. This allows the call processor to promptly notify any newly connected communications device of the status of its features and the existence of electronic mail messages. The code word is stored within a non-volatile memory within the station set which is assigned and programmed into the device prior to its connection to the PBX. A variety of memories can be utilized, including those that permit the stored code word to be subsequently altered if desired as well as those whose stored code word cannot be changed. The PBX, thereafter, utilizes this code word as a mechanism of addressing each communications device individually.

In the disclosed PBX 100 shown in FIG. 1, this code word is a multibit word which is processed by call processor 109. Pursuant to the present invention, the communications test device uses a test device identifier or "wild-card" code word, i.e., a multibit code word specifically reserved for communications link tracing and not programmed into any of communications devices 102-1 through 102-M for device identification. This wild-card code word is used as the predetermined test signal which is applied by communications test device 200 to the link during tracing. Since the wild-card code word is similar to those code words used for device identification and differs only in the specific arrangement of bits, any of communications devices 102-1 through 102-M can be utilized as the communication test device 200 shown in FIG. 2 simply by substituting the wild-card code word for the existing device identification code word. In the preferred embodiment, the communications test device 200 is the commercially available AT&T Model 7507 Integrated Services Digital Network (ISDN) Basic Rate Interface (BRI) voice/-data telephone set. This telephone set is used in PBX and No. 5 Electronic Switching System (ESS) applications. The arrangement of bits of the wild-card code word can be selected, as desired, by the communications system administrator. Advantageously, the Model 7507 telephone set has a display portion which heretofore was used to display information such as the name, telephone number or PBX extension of a calling party. In the present invention, the telephone set display, using the same signal processing set forth in the AT&T 801-802-100 ISDN BRI Interface Specification, which is hereby incorporated by reference, displays the communications-link-identifying information. This information, as will be described, is supplied by call processor 109.

Figure 3:
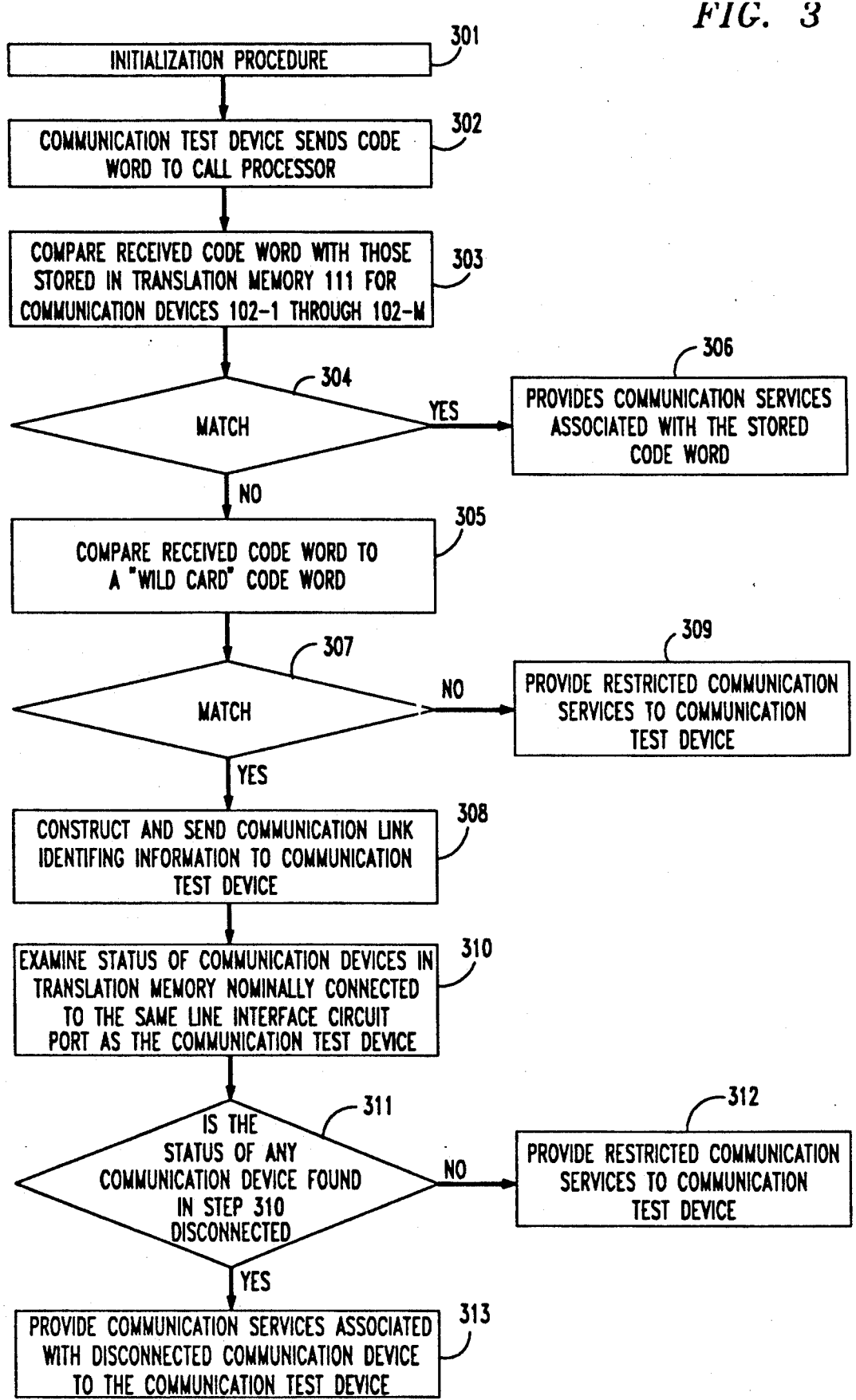
FIG. 3 is a flow chart of the sequence of operations performed in accordance with the present invention by the call processor of FIG. 1.

Refer now to FIG. 3 which shows the sequence of steps utilized by call processor 109 in supplying the communications-link-identifying information. As will be described, this processing is imbedded within the normal processing of communications device identifiers from communications device 102-1 through 102-M.

In the initialization procedure shown in step 301, each of communication devices 102-1 through 102-M and communications test device 200 performs a "hand-shaking" procedure with the call processor 109 of FIG. 1 when first connected to a communications link. In step 302, each of the aforementioned devices sends its stored code word to call processor 109 via the line interface circuit, LAN bus 113 and packet control 114, and M-bus 108 shown in FIG. 1. In step 303, the call processor compares the received code word with those stored in translation memory 111 for each of communications devices 102-1 through 102-M. If there is a match, as shown in steps 304 and 306, the communications services associated with the received device identifier are provided to the sending communications device. If not, as shown in step 305, the call processor compares the received code word with the predetermined wild-card code word, which serves to identify the transmitting device as a communications test device. If there is no match, as shown by steps 307 and 309, the call processor provides restricted communications services to the device which transmitted the code word in step 302. Such restricted service permits only the reception and processing of transmitted code words. If, however, as shown by steps 307 and 308, the transmitted code word matches the wild-card code word stored in the translation memory, the call processor assembles and forwards the communications-link-identifying information to the communications device which transmitted the code word in step 302.

The processing provided by call processor 109 also incorporates additional operations as shown by steps 310-313. In step 310, the call processor examines the status of the communications device normally associated with the communications link over which the wild-card code word was coupled. This examination is possible for several reasons. First, each transmission of a wild-card code word always includes an identification of the line interface circuit and port which received that wild-card code word. Second, the translation memory provides cross-referencing between a line interface circuit port identification, a codeword or communications device identifier, and a PBX extension. Lastly, for each PBX extension, the status memory maintains information indicating whether or not the communications device associated with that PBX extension is connected. If the status of the communications device, as shown in steps 311 and 312, is "disconnected", the call processor provides the communications services associated with this disconnected communications device to the communications test device. Advantageously, this allows the communications test device to completely emulate the communications device whose associated communications link is being traced. Such emulation, permits the craftsperson tracing the link to also verify the operability of all communications services normally provided to the disconnected communications device and thereby determine the existence of other communications problems. This complete emulation, as shown by steps 311 and 312, is not provided if the communications device associated with the traced communications link is currently connected to that link.

FIG. 4 shows the information stored in translation memory 111. Translation memory refers to the logical partition of memory that is used to store a collection of data that is entered by a system administrator via SAT 16 to control specific aspects of PBX 100. Translation data includes a number of data entries which remain fixed unless explicitly changed by a system administrator. Data entry 401 is designated for each PBX extension. For that extension, data entries 402 and 403 respectively designate the line interface circuit (LIC) and port on the LIC for that extension. Data entries 404-406 respectively denote the person or persons associated with the PBX extension, the type of communications device associated with the extension and the code word or device identification. Data entry 406 is the entry scanned by the call processor in step 303 of FIG. 3. The translation memory also stores the functionality of certain buttons on the communications device which may be altered by the system administrator to provide specified communications services such as total number of call appearances, abbreviated dialing (stored number), call forwarding, etc. There may be a number of such entries and FIG. 4 shows two such entries which are designated as 407 and 408. Communications service restriction information, such as no outgoing communications services, etc., is also stored for each PBX extension as designated by data entry 409. Finally, the translation memory also stores global information, such as routing schemes, as well as the wild-card code word or communications test device identifier which is designated as entry 410.

FIG. 5 shows the information stored in status memory 112 which is utilized by call processor 109. Status memory refers to the logical partition of memory that is used to store transient information that reflects the current state of the PBX. For each extension, the status memory stores an indication at data entry 501 as to whether the communications device associated with that extension is connected. It is entry 501 that the call processor examines at step 310 of FIG. 3. The state of the switch hook, designated by data entry 502, and the state of the speech path, i.e., whether or not the path is presently transferring data, are stored and designated by entry 503. Entries are also stored which indicate the state of each call appearance corresponding to a PBX extension. FIG. 5 shows two such entries which are designated as 504 and 505. It is envisioned here that each PBX has two call appearances. Entries are also stored, at entry 506, to indicate whether or not certain PBX features, such as call forwarding, send all calls, message waiting, etc., are active. Finally, the translation memory also stores resource usage information at entry 507, such as call attempts, call completions, etc.

Figure 6:
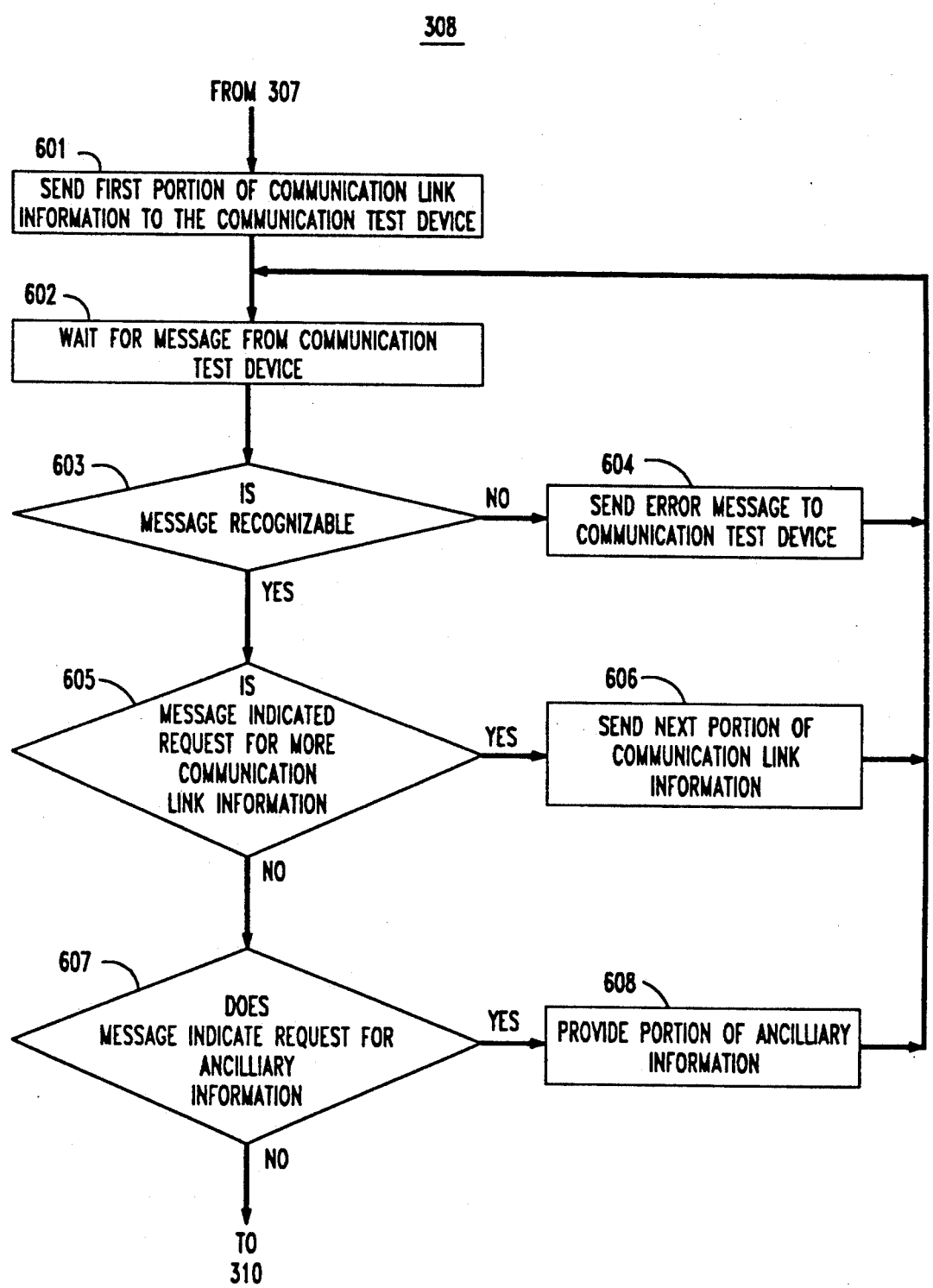
FIG. 6 is a flow chart of the sequence of operations which can be implemented in place of step 308 of FIG. 3.

The communications-link-identifying information coupled to the communications test device in step 310 can be provided in one block or can be provided in several portions, with a craftsperson having the capability of deciding whether more information is desired. FIG. 6 shows the one sequence of steps which provide the communications-link-identifying information in several messages. This sequence is an expansion of step 310 in FIG. 3. The advantages of this preferred mode is that as the link-identifying information sent to the display is divided into batches, the total amount of information sent is not limited to the capacity of the display at any instant. For example, a variety of information which identifies the communications link has been discussed. Such information includes the name of the person or persons associated with the communications device normally connected to the link and/or the PBX extension or extensions and/or device identification. With the implementation of FIG. 6, all of this link-identifying information can be supplied in predetermined batches to a smaller capacity display.

As shown in step 601 of FIG. 6, a first portion of the communications-link-identifying information is sent to the communications test device. At step 602, the call processor waits for a response from the communications test device. Such responses can be the pressing of predetermined keys on the touch-tone keypad in the test device. Upon receiving a response, the call processor examines it at step 603 to determine if it is recognizable, i.e., if it is one of plurality of predetermined responses. If the response is not recognizable, the call processor sends an error message back to the communications device at step 604. This error message may include helpful information, such as an indication of the appropriate responses at step 603. Assuming the response from the communications test device is recognizable, the processor determines at step 605 if the request is for more communications-link-identifying information. If so, at step 606 the next batch of this type of information is sent to the communications test device.

The craftsperson at the communications test device also has the ability to request ancillary information from the PBX. This capability is shown at step 607 wherein such information can be supplied via step 608. Ancillary information is defined herein as information not intended to identify the communication link but which is useful to a craftsperson. Examples of such information is the defined functionality of certain buttons on the communications device or the restriction information respectively designated as 407, 408 and 409 in FIG. 4. The availability of this information allows the craftsperson to respond to a user's complaint about the lack of certain functionality or communications services by verifying with the system that such functionality or services have been provided to the user. Another type of ancillary information might be whether or not there are other communications devices which are presently connected and coupling information over the link. This information, available from the status memory, is useful to a craftsperson as it indicates whether ongoing communications would be disrupted if the communications link was temporarily severed during repair of a localized fault. If no ancillary information is desired, the expanded sequence of operations shown in FIG. 6 proceeds to step 310 in FIG. 3.

In its broadest aspects, the present invention can be implemented using a variety of signal formats. One such format is shown in FIG. 7. Advantageously, this illustrated format utilizes the well-known ISDN BRI format in the communications link and, therefore, is compatible with the existing operation of existing PBXs. The ISDN BRI format, as shown in FIG. 7, incorporates recurring frames 701. Each frame includes two time intervals for data and one for signalling. The data time intervals or channels are commonly referred to as the B1 and B2 channels and are designated as 702 and 703 in FIG. 7. The time interval reserved for signalling is commonly referred to as the D-channel and is designated as 704. Pursuant to the present invention, the wild-card code word is transmitted in the D-channel of a plurality of successive frames 601. Within the line interface circuit, this identification, along with other information, is extracted to form signalling message 705. The wild-card code word constitutes sub-message 706 within this signalling message. Advantageously, when a communications link is not being traced, sub-message 706 is used, as necessary, to couple the identification of communications devices connected to that link. The remainder of message 705 includes other sub-messages, designated as 706 and 707, which are also extracted from the D-channel and are not pertinent to the present invention.

Each line interface circuit in the PBX which receives a wild-card code word couples this identifier to the call processor via the LAN bus, packet control circuit and M-bus. Specifically, the wild-card code word is transmitted within LAN bus message 709 which is formed by the receiving line interface circuit. Message 709 also includes an identification of the line interface circuit which received the wild-card code word along with an identification of the port on that line interface circuit. These two identifiers are designated as 711 and 712. Preferably, message 709 also includes an address or identification of packet control circuit 114, designated as 710, so that LAN message 709 will be ignored by other line interface circuits connected to the LAN bus. Other information, designated as 714, such as error correction information, is also incorporated with message 709.

While the present invention has been described in reference to a disclosed embodiment, numerous other arrangements will be apparent to those of ordinary skill in the art.

First, for example, while in the disclosed embodiment, the communications-link-identifying information is viewable on a display in the communications test device, this information could be coupled to a printer to provide a written output of words and/or graphics. Or, the information could be coupled through a speech synthesizer to provide audible speech. Second, while in the disclosed embodiment, the predetermined test signal is applied by a communications test device and the link-identifying information is supplied back to this device, such information could be coupled to another communications device or broadcasted to one or more devices. Moreover, the link-identifying information coupled back need not be supplied over the same communications path through which the predetermined test signal was applied. In this regard, the test signal could be supplied to a wire link and the identifying information coupled back via a radio link. Finally, while the communications links are wire conductors in the disclosed embodiment, such links can also be optical fibers or radio channels or could include a combination of different media.

We claim:

1. A private branch exchange having a control module which selectively interconnects a trunk extending from a trunk side of said control module to at least one of a plurality of communications links, said plurality of communications links extending from a line side of said control module to communications devices, said private branch exchange comprising means in said control module for receiving a predetermined test signal which has been applied to a communications link, said predetermined test signal is distributed over a plurality of recurring frames in a time-division-multiplexed signal format and said receiving means assembles said predetermined test signal from these frames; and means in said control module responsive to said predetermined test signal for providing to said communications link information which identifies said communications link.

2. The private branch exchange of claim 1 wherein said predetermined test signal is a digital word including a plurality of bits.

3. The private branch exchange of claim 1 wherein the information which identifies said communications link includes at least one name which is associated with said communications link.

4. The private branch exchange of claim 1 wherein the information which identifies said communications link includes an least one telephone number associated with said communications link.

5. The private branch exchange of claim 1 wherein the information which identifies said communications link includes an identification of equipment providing communications capabilities over said communications link.

6. The private branch exchange of claim 1 wherein the information which identifies said communications link includes at least one private branch exchange extension associated with said communications link.

7. The private branch exchange of claim 1 wherein said receiving means also receives another predetermined test signal and said providing means also provides additional information relating to at least one communication device associated with said communications link.

8. The private branch exchange of claim 7 wherein the additional information relates to communications service capabilities of said device associated with said communications link.

9. The private branch exchange of claim 7 wherein said communications link is associated with at least one communications device having at least one component which can actuate an associated predetermined communications function and the additional information relates to the function provided by each component.

10. The private branch exchange of claim 7 wherein the additional information relates to whether said one communications device associated with said communications link is currently connected to said communications link.

11. The private branch exchange of claim 7 wherein the additional information relates to whether said one communications device associated with said communications link is currently coupling signals through said communications link.

12. A method of testing communications links in a private branch exchange having a control module which interconnects a trunk extending from a trunk side of said control module to said communications links extending from a line side of said control module to communications devices, said method comprising the steps of
receiving a predetermined test signal in said control module which has been applied to a communications link being distributed over a plurality of recurring frames in a time-division-multiplexed signal format and said receiving step assembles said predetermined test signal from these frames; and
providing from said control module to said communications link information which identifies said communications link in response to said predetermined test signal.

13. Apparatus for use in a communications system having a control module, and a plurality of communications links extending therefrom for connection to communications devices, said apparatus comprising
means in said control module for receiving predetermined signals which have been applied to a communications link; and
means in said control module responsive to a first one of said predetermined signals for providing to said communications link information which identifies said communications link and said providing means also being responsive to a second one of said predetermined signals, following said first, for providing additional information relating to service capabilities provided by a communications device connected to said communications link.

14. The apparatus of claim 13 wherein the additional information relates to whether one communications device associated with said communications link is currently connected to said communications link.

15. The apparatus of claim 13 wherein the additional information relates to whether one communications device associated with said communication link is currently coupling signals through said communications link.

16. Apparatus for use in a communications system having a control module and a plurality of communications links extending therefrom for connection to communications devices, said apparatus comprising
means in said control module for receiving a predetermined set of signals which have been applied to a communications link; and
means in said control module responsive to a first plurality of signals in said set for providing to said communications link information which identifies said communications link and wherein different link Identifying information is provided in response to each signal in said first plurality.

17. The apparatus of claim 16 wherein said providing means also provides additional information to said communications link which relates to communications capabilities of a communications device connected to said link in response to another signal in said set and not part of said first plurality.

18. A private branch exchange having a control module which selectively interconnects a trunk extending from a trunk side of said control module to at least one of a plurality of communications links, said plurality of communications links extending from a line side of said control module to communications devices, said private branch exchange comprising
means in said control module for receiving a predetermined test signal which has been applied to a communications link, said predetermined test signal is received by said receiving means in a signalling time interval within a time-division-multiplexed format including said signalling time interval and other intervals for non-signalling information; and
means in said control module responsive to said predetermined test signal for providing to said communications link information which identifies said communications link.

19. The private branch exchange of claim 18 wherein said format is an integrated digital services network basic rate interface format.

* * * * *